May 1, 1962
V. M. DURYEA
3,031,790
FISHING JIGS
Filed Aug. 29, 1960
2 Sheets-Sheet 2
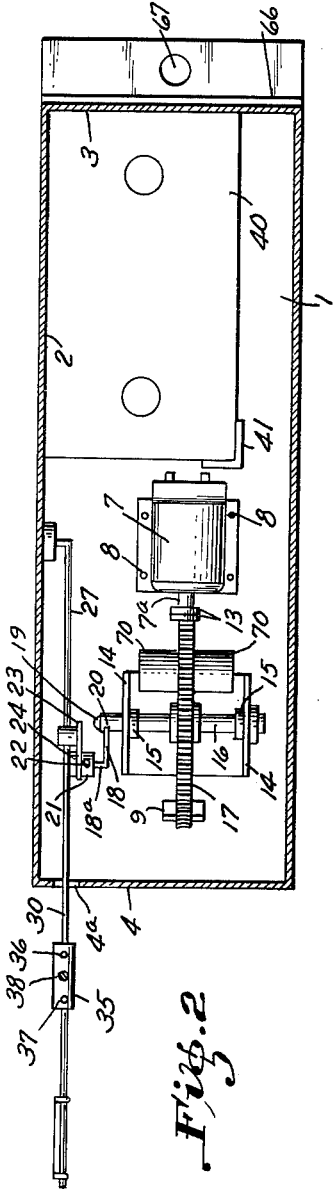
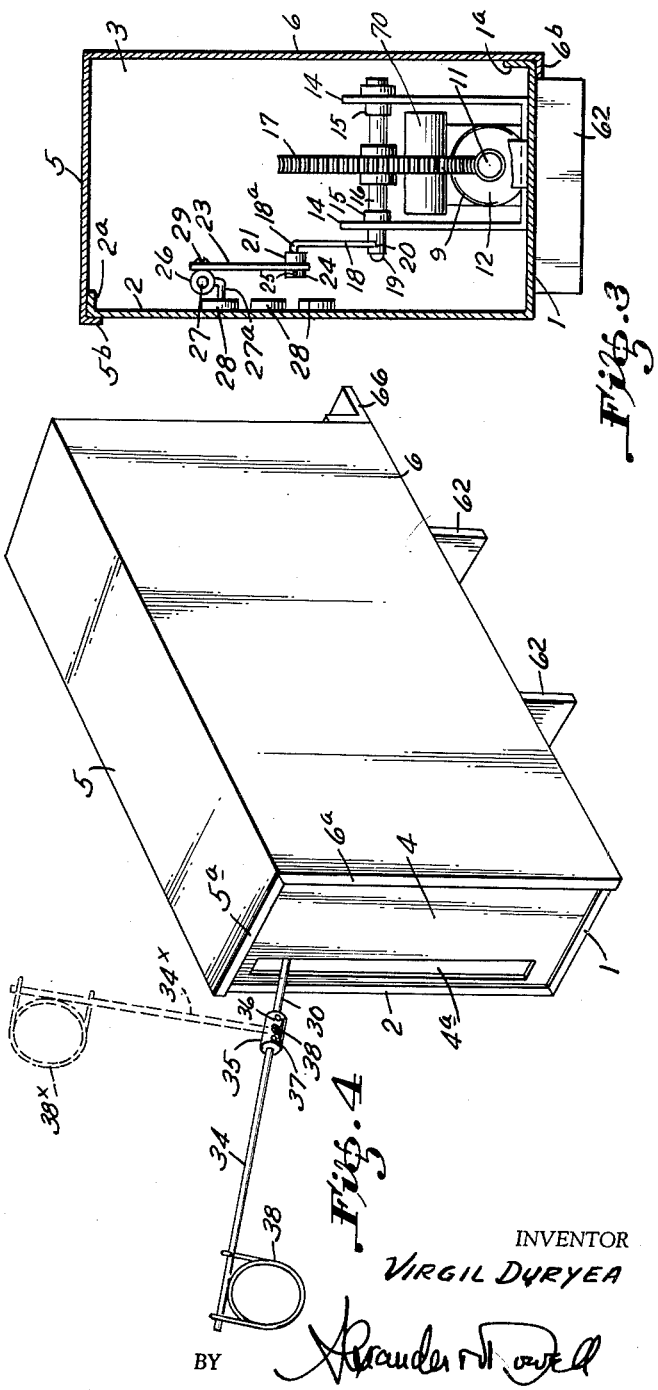
INVENTOR
*VIRGIL DURYEA*
BY
ATTORNEYS

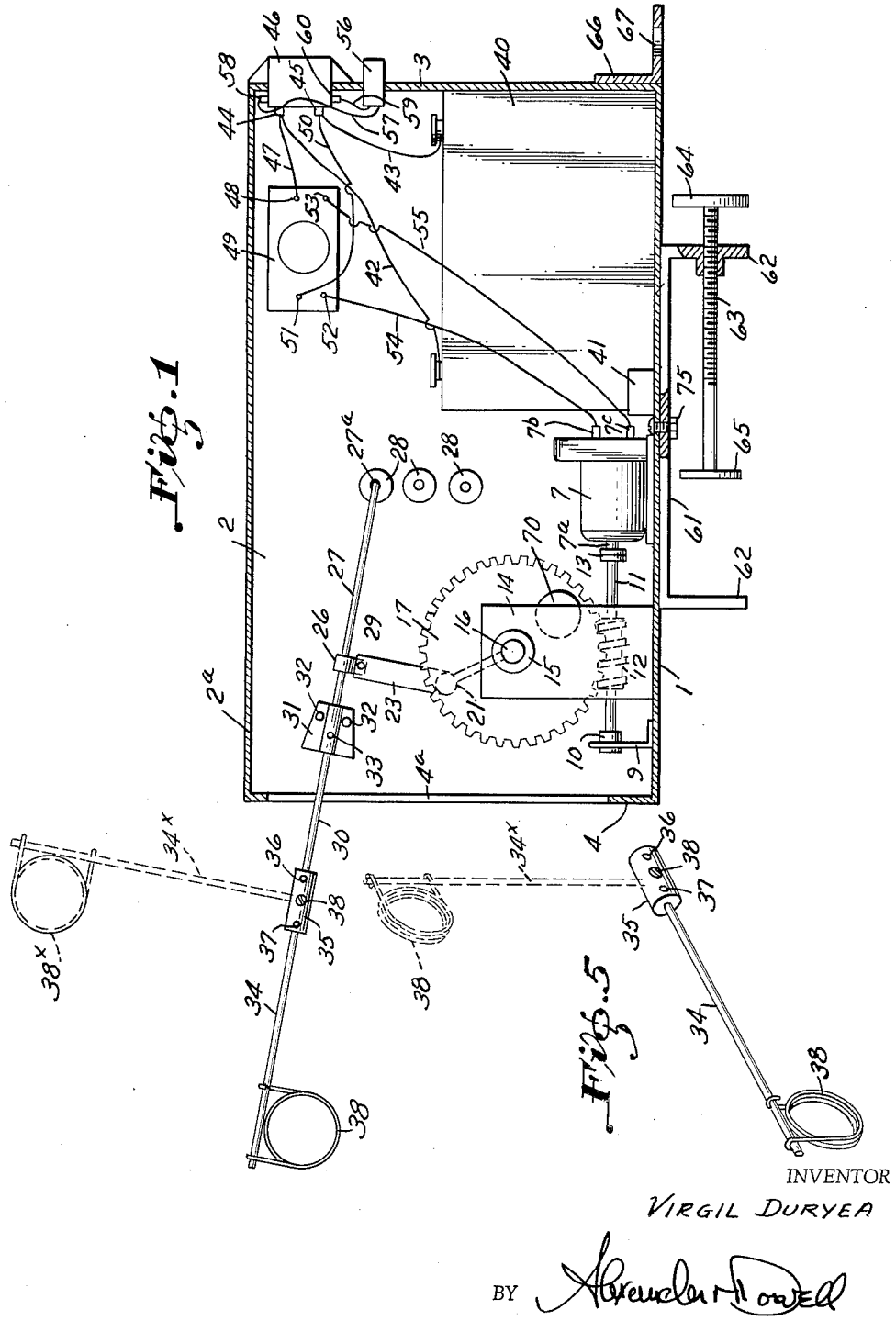

United States Patent Office 3,031,790
Patented May 1, 1962

3,031,790
FISHING JIGS
Virgil M. Duryea, R.F.D. 3, Rochester, Minn.
Filed Aug. 29, 1960, Ser. No. 52,653
14 Claims. (Cl. 43—19.2)

This invention is a novel fishing jig designed for giving fishing lines a controlled action for imparting to the fishing line a jerking motion, which motion has become quite popular in the last few years, but to the best of my knowledge said jerking motion has been necessarily obtained by the fisherman jerking or whipping the fishing rod itself. After tests and experimentation I have developed a controlled action jig which is simple, novel, and efficient, there being no springs, catches, pawls, trips or other complicated parts utilized in its construction, and the jig being so constructed that several adjustments may be made therein which change the motion imparted to the bait on the fishing line.

I will explain the invention with reference to the accompanying drawings which illustrate one practical embodiment thereof, to enable others familiar with the art to adopt and use the same; and will summarize in the claims the novel features of construction, and novel combinations of parts, for which protection is desired.

In said drawings:

FIG. 1 is a vertical longitudinal section through the jig.
FIG. 2 is a horizontal section therethrough.
FIG. 3 is a vertical transverse section through the jig.
FIG. 4 is a front perspective view of the jig.
FIG. 5 is a perspective view of a detail.

My novel jig comprises a casing having a base 1 of substantially rectangular shape, and having an integral back 2 having a flanged top 2a, the base 1 being also provided with a flange 1a along its edge opposite from the back 2. An end plate 3 connects the back 2 and base 1, the same being of substantially rectangular shape. Also at the other end, an end plate 4 is provided similar in size and shape to end plate 3, except that end plate 4 is provided adjacent back 2 with a vertical slot 4a for the purpose hereinafter described.

The casing 1–4 is completed or closed by means of a removable cover consisting of a top 5 and a front plate 6, the end edges of which are flanged as at 5a and 6a as shown in FIG. 4; and top plate 5 is further provided with a flange 5b adapted to overlie the flanged edge 2a of back plate 2 as shown in FIG. 3, while the front 6 is provided with a flange 6b adapted to underlie the flanged edge 1a of base 1, the cover 5—6 being thus removably yieldably secured to the back 2 and base 1 without necessitating use of extraneous locking devices. Cover 5—6 normally protects the parts of the jig from injury by extraneous objects, and is readily removable by prying the flanges 6b or 5b over the ends of the back 2 or base 1.

Mounted on base 1 is a motor 7 secured thereto by screws or bolts 8, and having a shaft 7a, said motor being located adjacent the center of base 1 with shaft 7a disposed parallel with and above the base.

On base 1 in alignment with shaft 7a is a clip 9 which may be secured thereto by welding, same carrying a bearing 10, FIG. 1, for a worm shaft 11 which carries a worm 12; shaft 11 being provided with a coupling 13 of any desired form for securing the free end of worm shaft 11 to motor shaft 7a.

Upon the base 1, at opposite sides of worm shaft 11, are opposed clips 14, the bases of which are preferably welded to the base, said clips carrying bearings 15 for a shaft 16 upon which is mounted a worm wheel 17 which meshes directly with worm 12, which shaft 16 is prevented from axial movement in bearings 15 so that worm wheel 17 will be constantly in mesh with worm 12.

The end of shaft 16, adjacent the back 2, is provided with a transverse bore 20 for receiving a crank arm 18, the end of which passes through bore 20 and is locked in position therein by means of a screw 19 or the like threaded into a tapped bore in the end of shaft 16, so that when screw 19 is loosened the crank arm 18 may be adjusted radially of shaft 16, and locked in adjusted position by tightening screw 19.

The outer end of crank arm 18 is flanged outwardly as at 18a, and carries a collar 21 which is locked thereto by a set screw 22 (FIG. 2) or the like. Pivoted on the flanged end 18a is one end of a link 23 which is maintained in rotary contact with collar 21 by a second collar 24 which is locked on the flanged portion 18a by a set screw 25 or the like. In this manner the link 23 is permitted to oscillate on the flanged portion 18a as the worm wheel 17 is rotated.

The outer end of the link 23 carries an eye 26 which receives a swinging arm 27, the outer end of which extends toward and terminates adjacent the slot 4a in end plate 4 within the casing or housing. The inner end of arm 27 is flanged as at 27a and is adapted to be inserted in any one of a series of bushings 28 (FIG. 1) mounted on back plate 2 and having bores extending through plate 2 forming bearings for the reception of the flanged end 27a which may be inserted into any of the bushings 28 by merely springing the arm 27 sufficiently to disengage or engage any of the bushings 28.

The eye 26 is pivotally mounted on the end of the link 23 by means of a screw 29 or the like, which also binds the eye on the arm 27, whereby as the worm wheel 17 is rotated, arm 27 will be raised and/or lowered throughout an arc depending upon the radius of arm 18 with respect to the axis of shaft 16, and the position of eye 26 on arm 27. By loosening screw 29 it is obvious that eye 26 may be adjusted forwardly or rearwardly of the arm 27 and then again tightened to vary the amplitude of vertical swing of said arm.

In alignment with the arm 27 and extending through the slot 4a is an extension rod 30 which has a frangible connection with the outer end of arm 27 by means of a pair of opposed plates 31 (FIG. 1), which pair are secured together adjacent one end by screws 32 or the like binding the plates around the outer end of arm 27, the pair of plates being each formed with a semi-cylindrical groove forming a bore receiving the arm 27 and rod 30. The end of extension rod 30 is passed into the opposed grooves between the plates 31 and is fixed therein by means of a frangible pin 33 or the like which also passes through the adjacent end of extension rod 30.

The other end of the extension rod 30 terminates a short distance beyond the slot 4a in end plate 4, and is adapted to hold an agitator rod 34 which may be disposed either in axial alignment with extension rod 30 (as shown in full lines at 34, FIGS. 1, 4 and 5) or may be disposed normal thereto as shown in dotted lines 34x in FIGS. 1 and 5, depending upon the desired jerking action to be imparted to the finishing line.

A coupling member 35 of tubular form connects the ends of the extension rod 30 and agitator rod 34, the same being secured to the end of extension rod 30 by means of a set screw 36 and also may be secured to the end of agitator rod 34 by means of a set screw 37 or the like. By loosening the set screw 37 the agitator arm 34 may be placed in a transverse bore in the coupling member 35 disposed normal to the axis of extension rod 30 and secured in position therein by set screw 38, the agitator rod then assuming the position shown in dotted lines 34x in FIGS. 1, 4 and 5. By loosening the set screw 36 the agitator rod 34 may be entirely removed from the extension rod 30 for purpose of packing and transportation.

The outer end of agitator rod 34 carries a coil 38 which consists of about three contacting and concentric loops of wire having their ends secured to rod 34, the loops being sufficiently flexible to permit the end of the fishing line adjacent to the fish hook to be slipped between adjacent loops of the coil 38 so as to be frictionally gripped whereby a vertical jerking motion may be imparted to the hooked end of the fishing line, the line being readily capable of ready disengagement with the loops of coil 38 without damaging the jig, in event the line should become engaged with a snag or other heavy object.

In order to actuate the motor 7 without source of external power, I provide within the casing or housing a self-contained battery 40 which seats in the corner between the back plate 2 and end plate 3, the same being held against shifting movement by means of an angle clip 41 which is mounted edgewise on base plate 1 and is welded or otherwise secured to base plate 1 in such manner as to receive the corner of battery 40 as shown in FIGS. 1 and 2.

The terminals of battery 40 are connected by wires 42, 43 to terminals 44, 45 respectively, of a rheostat 46 (FIG. 1) the resistance of which may be regulated in any desired manner, the particular form of rheostat forming no part of my present invention. From the rheostat terminal 44 a wire 47 connects with primary terminal 48 of a transformer 49, while the terminal 45 of the rheostat is connected by a wire 50 with the primary terminal 51 of said transformer. The secondary terminals 52 and 53 of the transformer 49 are connected by wires 54, 55 directly with the terminals 7b, 7c of motor 7, preferably through a fuse (not shown), said fuse protecting the motor from injury due to overloads of current.

In case it is desired to excite the motor 7 from an external source of current, I provide a plug 56 which may be connected directly to a source of electric current, said plug being connected by wire 57 to terminal 58 of the rheostat 46 and by wire 59 with the terminal 60 of said rheostat. Thus the motor may be driven either directly from the self-contained battery 40, or from an external source of electric current through the plug 56, as desired.

Swivelled as at 75 on the bottom of base 1 is a clamping plate 61 having flanged ends 62 in one of which is journaled a threaded shaft 63 carrying a hand knob or crank 64 on its outer end, and carrying a clamping head 65 on its inner end, whereby when the hand knob 64 is rotated the base 1 may be held by clamping pressure on any fixed object on a boat, wharf or the like, to prevent same from being accidentally knocked into the water. Also, at the bottom of the end plate 3 I provide an angle clip 66 having a hole 67 therein for the reception of a screw or bolt or spike, whereby the same may be swingably mounted on an ice surface adjacent a fishing hole, or may be mounted upon a boat deck or pier deck or the like, as desired, when the clamping plate 61 is removed from the base 1.

In order to counterbalance the worm wheel 17, I provide two lead counterweights 70 which are secured together through a radial slot in the worm wheel by means of a screw, which screw when loosened will permit the counterweights to be adjusted radially of the crank arm 18, the counterweights also counterbalancing the weight of the bait used on the hook of the fishing line and the parts of the jig from the crank arm 18 outwardly to the loops 38 of agitator rod 34.

My novel jig as above described has several adjustments which may be utilized to change the jerking motion imparted to the bait on the fishing line hook, one such adjustment comprising the series of bushings 28, FIG. 1, which receive the flanged end 27a of arm 27 which supports the agitator rod 34. Obviously the amplitude or swing of the agitator rod 34 may be adjusted into three positions depending upon the particular bushing 28 in which the flanged end 27a of arm 27 is inserted. Also the connecting rod 23 may be adjusted along the arm 27 by loosening the screw 29 and shifting the collar 26 axially along rod 27 and thereafter tightening the screw 29, thus adjusting the amplitude of the agitator rod 34. Moreover, this amplitude may be further adjusted by loosening the screw 19 which connects the crank arm 18 to shaft 16 and shifting the crank arm 18 radially of shaft 16 and again tightening the screw 19 after desired adjustment of the crank arm 18 has been made, thus radially shortening or lengthening the crank arm 18.

Moreover, the upward and downward action of the agitator rod 34 may be changed by reversing the direction of rotation of the motor 7, which may be accomplished by merely changing the motor leads 54 and 55, FIG. 1. Due to the above described arrangement, when the motor 7 is rotated in a clockwise direction the upstroke of the agitator rod 34 will be faster or quicker than the down stroke, and conversely, when the motor is rotating in a counterclockwise direction, the upstroke of the agitator rod 34 will be slower than the down stroke.

The member 31, FIG. 1, forms a safety breakaway or frangible catch provided on the agitator rod and is such that if the rod should come in contact with a person's body or clothing, or any other fixed object, the extension rod 30 will be readily released from the arm 27, the safety catch preventing injury to the fisherman or damage to the jig.

The fishing line inserted between the coils of loops 38 will be pulled loose from the loops of the coil 38 when a fish bites the bait on the hook, the line being at that time jerked out from between the coils 38.

My fishing jig may be used for trolling by clamping same to the transom of the boat between the flange 62 and the head 65 of the clamping member 63.

By changing agitator rod 34 from its horizontal position in connector 35 to its vertical position 34x the fishing line will give the bait being trolled behind the boat a swinging or erratic motion which is very helpful in attracting the fish to take the bait.

A rheostat 46 is provided for changing the speed of the motor 7 so that the bait will partake of the action which the manufacturer intended.

Nearly all boats are now equipped with outboard motors, most of which are battery-operated; some operated on a six-volt battery and some operating on a twelve-volt battery. A plug 56 has been installed in my jig and can be used to operate the motor 7 which would normally require from three to six volts, the transformer 49 being adapted to regulate the current from twelve to six volts. The same method is used when an automobile is driven on the ice and the battery of the automobile is used as the source of current for the motor 7, in which case the fuse (not shown) is provided in the motor circuit to protect the motor 7 from being burned out in event too high a voltage should be impressed upon the terminals of the motor. My jig also operates on a three to six-volt drycell battery 40, which is self-contained in the casing or housing as shown in FIGS. 1 and 2.

The detachable boat clamp is provided to engage a boat or dock member and is arranged to swivel on the pivot 75 so that the jig may swivel in any direction on the base upon which it is fixed. Also the detachable holder 66 is provided for use on ice or dock so that when the clamping member 61 is removed, the jig may be pivoted out of the way when landing fish, the same also providing a safety device so that the jig cannot be accidentally knocked or pushed into the water.

My jig has a very neat appearance and all the moving parts are contained in the weatherproof case with the exception of the agitator rod 34, and thus the same may be used in any kind of weather and in any position. The cover 56 of the casing is adapted to snap over the back 2 and base 1 in such manner that it locks itself to the back 2 and base 1, and thus no screws, hinges or catches are required to hold the cover in position to close the case.

Instead of using the worm 12 and worm wheel 17, obviously the wheel 17 may be a spur gear meshing with a pinion on the shaft 11, such changing of parts, of course, requiring the axis of the motor shaft 7a to be disposed parallel to the axis of the shaft 16 of gear 17, so that the gear and pinion will mesh.

Anyone using my jig can obtain the action of the agitator rod 34 which he desires for any style jig or bait by merely making one or more of the adjustments provided as above outlined.

I do not limit my invention to the exact form shown in the drawings, for obviously changes may be made therein within the scope of the claims.

I claim:

1. A fishing jig comprising a casing having a base; a back; end plates connecting the back and base, one of said end plates having a vertical slot; a prime mover on said base; a horizontal shaft journaled on the base; a rotatable member on said shaft; means for rotating the member by the prime mover; a crank arm carried by the shaft; a swinging arm pivoted on said back and in alignment with said slot; a link having one end secured to said swinging arm and having its other end pivoted on said crank arm; an extension rod aligned with said swinging arm and extending through said slot; a frangible connection between the adjacent ends of the extension rod and swinging arm; an agitator rod having contacting concentric resilient loops secured thereto adjacent its outer end between which loops a fishing line may be releasably engaged; means for mounting the agitator rod in alignment with or normal to the extension rod; means for mounting the casing on a fixed support; and means for activating the prime mover.

2. In a jig as set forth in claim 1, said crank arm extending through a transverse bore in the shaft; and a set screw engaged in a tapped bore disposed axially of the shaft and entering the transverse bore to maintain the crank arm in radially adjusted position.

3. In a jig as set forth in claim 1, the upper end of said link carrying a pivoted eye through which the swinging arm extends, and a set screw extending into the eye adapted to engage the swinging arm to bind the eye thereto in axially adjusted position.

4. In a jig as set forth in claim 1, said arm having a right-angled bend at its inner end, and a vertical series of bushings on the back adapted to be engaged by said right-angled bend.

5. In a jig as set forth in claim 1, said frangible connection comprising a pair of opposed plates each having a semi-cylindric groove together forming a bore receiving the ends of the swinging arm and extension rod; means for clamping the plates together around the swinging arm; and a frangible pin transfixing the plates and extension rod adapted to be broken when the agitator rod is held from free movement.

6. In a jig as set forth in claim 1, said mounting means for the agitator rod comprising a collar having a bore receiving the ends of the agitator rod and extension rod; means for binding the rod in said bore; said collar having a transverse bore adapted to receive the end of the agitator rod; and means for binding the agitator rod in said transverse bore.

7. A fishing jig comprising a casing having a base; an integral back; end plates connecting the back and base, one of said end plates having a vertical slot; a motor mounted on said base; a horizontal shaft mounted on the base; a rotatable member mounted on said shaft; means for rotating the member by the motor; a crank arm radially adjustably carried by the shaft; a swinging arm pivoted on said back and in alignment with said slot; a link axially adjustably mounted at one end on said swinging arm and having the other end pivoted on said crank arm; an extension rod aligned with said swinging arm and extending through said slot; a frangible connection between the adjacent ends of the extension rod and swinging arm; an agitator rod having a series of contacting concentric resilient loops secured thereto adjacent its outer end between which loops a fishing line may be releasably engaged; means for mounting the agitator rod in alignment with or normal to the extension rod; means for mounting the casing on a fixed support; and electric means for activating the motor.

8. In a jig as set forth in claim 7, said member rotating means comprising intermeshing gears on said member, and on the shaft of said motor.

9. In a jig as set forth in claim 7, said crank arm extending through a transverse bore in the shaft; and a set screw engaged in a tapped bore disposed axially of the shaft and entering the transverse bore to maintain the crank arm in radially adjusted position.

10. In a jig as set forth in claim 7, the upper end of said link carrying a pivoted eye through which the swinging arm extends; and a set screw extending into the eye adapted to engage the swinging arm to bind the eye thereto in adjusted position.

11. In a jig as set forth in claim 7, a vertical series of bushings on the back adapted to be engaged by a right-angled bend at the inner end of the swinging arm.

12. In a jig as set forth in claim 7, said frangible connection comprising a pair of opposed plates each having a semi-cylindric groove together forming a bore receiving the ends of the swinging arm and extension rod; screws for clamping the plates together around the swinging arm; and a frangible pin transfixing the plates and extension rod and adapted to be broken when the agitator rod is held from free movement.

13. In a jig as set forth in claim 7, said mounting means for the agitator rod comprising a collar having a bore receiving the ends of the agitator rod and extension rod; set screws for binding the rods in said bore; said collar having a transverse bore adapted to receive the end of the agitator rod; and a further set screw for binding the agitator rod in said transverse bore.

14. In a jig as set forth in claim 7, said electric means comprising an electric circuit within the casing including the motor, a battery, a transformer, a rheostat, and an inlet plug, whereby the motor may be activated by the battery or by an external source of electric power.

References Cited in the file of this patent

UNITED STATES PATENTS

| | | |
|---|---|---|
| 1,163,967 | Arntzen et al. | Dec. 14, 1915 |
| 1,413,915 | Horney | Apr. 25, 1922 |
| 2,144,523 | Brown | Jan. 17, 1939 |
| 2,484,357 | Schwenk | Oct. 11, 1949 |
| 2,643,478 | Paulsen | June 10, 1953 |
| 2,707,843 | Howe | May 10, 1955 |
| 2,846,797 | Boyd | Aug. 12, 1958 |